United States Patent
Kline

(10) Patent No.: US 12,514,744 B1
(45) Date of Patent: Jan. 6, 2026

(54) DENTAL APPLIANCE

(71) Applicant: John C. Kline, Akron, OH (US)

(72) Inventor: John C. Kline, Akron, OH (US)

(73) Assignee: John C. Kline, Akron, OH (US)

( * ) Notice: Subject to any disclaimer, the term of this patent is extended or adjusted under 35 U.S.C. 154(b) by 0 days.

(21) Appl. No.: 19/188,302

(22) Filed: Apr. 24, 2025

(51) Int. Cl.
*A61F 5/56* (2006.01)

(52) U.S. Cl.
CPC ........ *A61F 5/566* (2013.01); *A61F 2005/563* (2013.01)

(58) Field of Classification Search
CPC ...... A61F 5/00; A61F 5/56–58; A61F 5/0003; A61F 5/0006; A61C 7/08; A61C 7/36; A63B 71/08–10; A63B 23/03; A63B 23/032
See application file for complete search history.

(56) References Cited

U.S. PATENT DOCUMENTS

| | | | |
|---|---|---|---|
| 3,488,848 A * | 1/1970 | Lerman | A61C 9/00 433/68 |
| 3,924,638 A | 12/1975 | Mann | |
| 4,211,008 A | 7/1980 | Lerman | |
| 4,976,618 A * | 12/1990 | Anderson | A61C 19/04 433/215 |
| 5,899,691 A * | 5/1999 | Parker | A61F 5/566 601/38 |
| 6,164,278 A | 12/2000 | Nissani | |
| 7,950,394 B2 | 5/2011 | Elkin | |
| 8,684,734 B1 | 4/2014 | Lyren | |
| 8,689,797 B2 | 4/2014 | Elkin | |
| 8,826,913 B2 | 9/2014 | Kline | |
| 9,592,106 B2 | 3/2017 | Piasini | |
| 9,730,771 B2 | 8/2017 | Westover | |
| 9,750,628 B2 * | 9/2017 | von Seck | A61F 5/0006 |
| 9,757,213 B2 | 9/2017 | Kim | |
| 10,046,199 B2 * | 8/2018 | Lee | A63B 21/0421 |
| 10,328,225 B2 | 6/2019 | Garner | |
| 10,610,403 B2 | 4/2020 | Kline | |
| 11,260,189 B2 | 3/2022 | Garner | |
| 11,266,802 B2 | 3/2022 | Garner | |
| 2011/0114100 A1 | 5/2011 | Alvarez | |
| 2012/0227749 A1* | 9/2012 | Kondo | A61F 5/566 128/848 |
| 2022/0008244 A1 | 1/2022 | Hart | |
| 2022/0096767 A1 | 3/2022 | Garner | |
| 2023/0233923 A1 | 7/2023 | Garner | |
| 2024/0374352 A1 | 11/2024 | Garner | |
| 2025/0018140 A1 | 1/2025 | Garner | |

FOREIGN PATENT DOCUMENTS

WO 2023129154 A1 7/2023

* cited by examiner

*Primary Examiner* — Michelle J Lee
(74) *Attorney, Agent, or Firm* — Emerson, Thomson & Bennett, LLC; Timothy D. Bennett

(57) ABSTRACT

A dental appliance may include a retaining surface and a treatment portion and may be positioned within a patient's mouth in a treatment position with the treatment portion positioned between a protrusion and a canine tooth. Movement of the mouth from a relatively open position into a relatively closed position may cause the treatment portion to apply a force to the patient's jaw urging the mouth toward the relatively open position until the mouth returns to the relatively open position and may thereby directly attenuate bruxism.

16 Claims, 10 Drawing Sheets

Relatively Open Position

Relatively Closed Position

Relatively Open Position

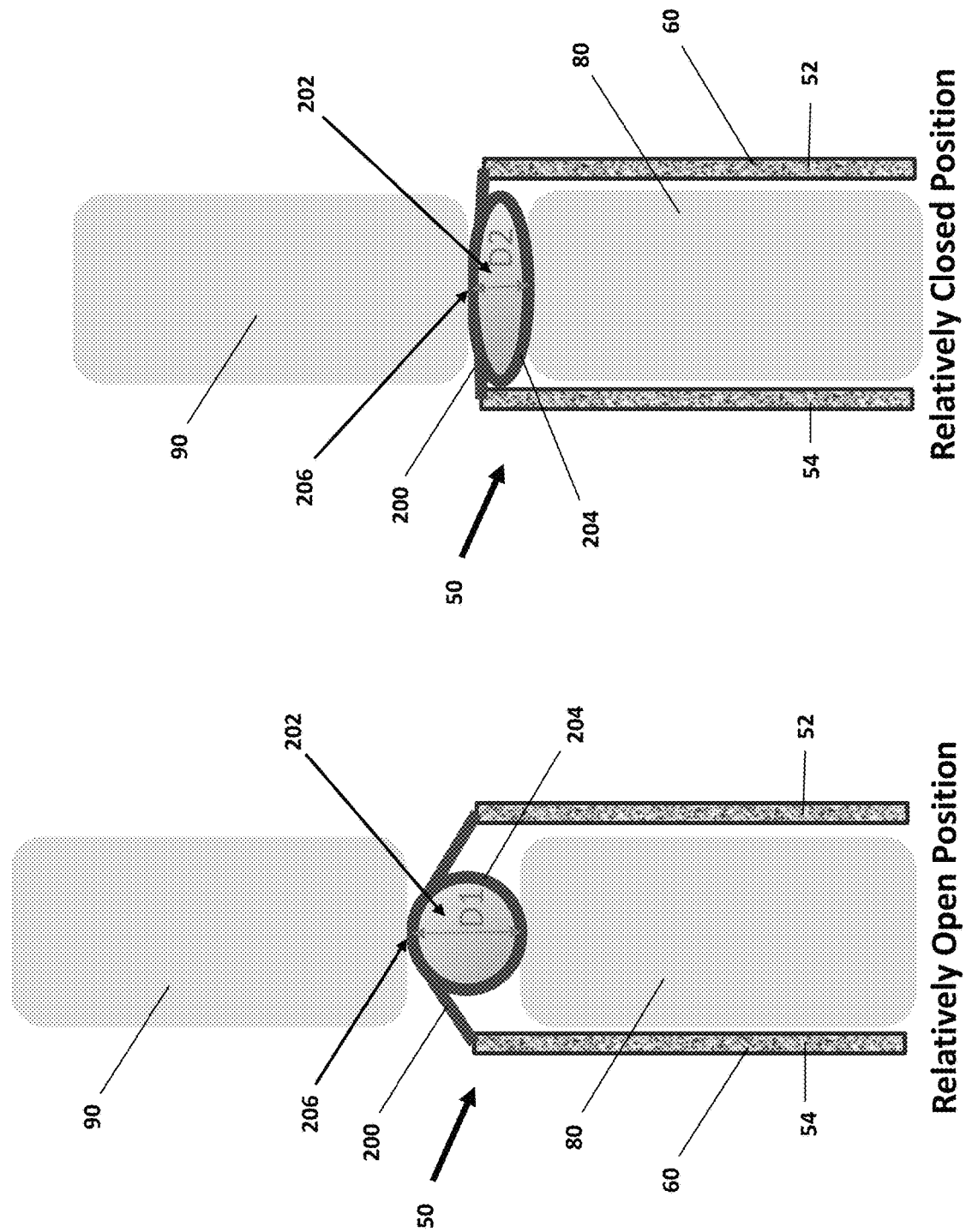

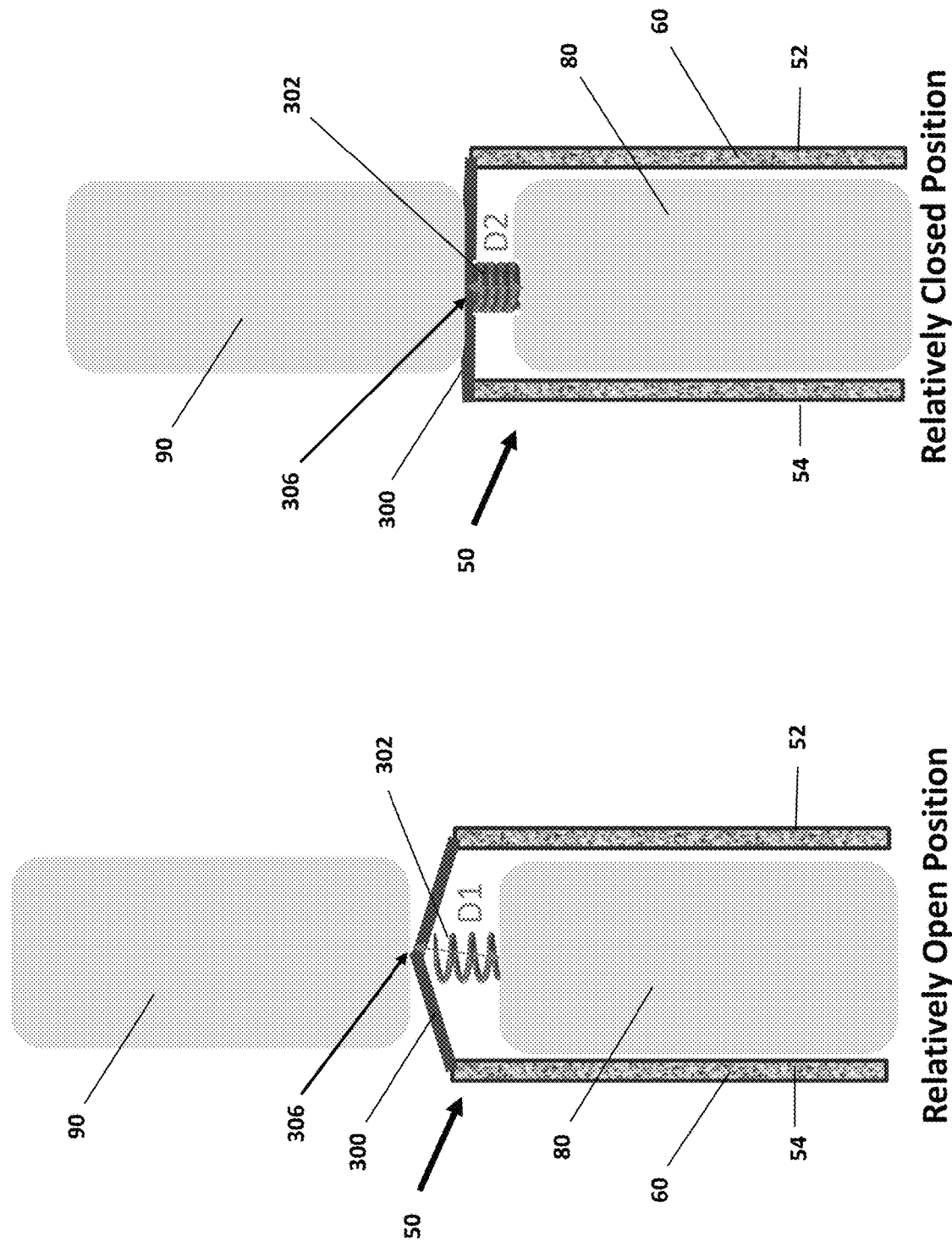

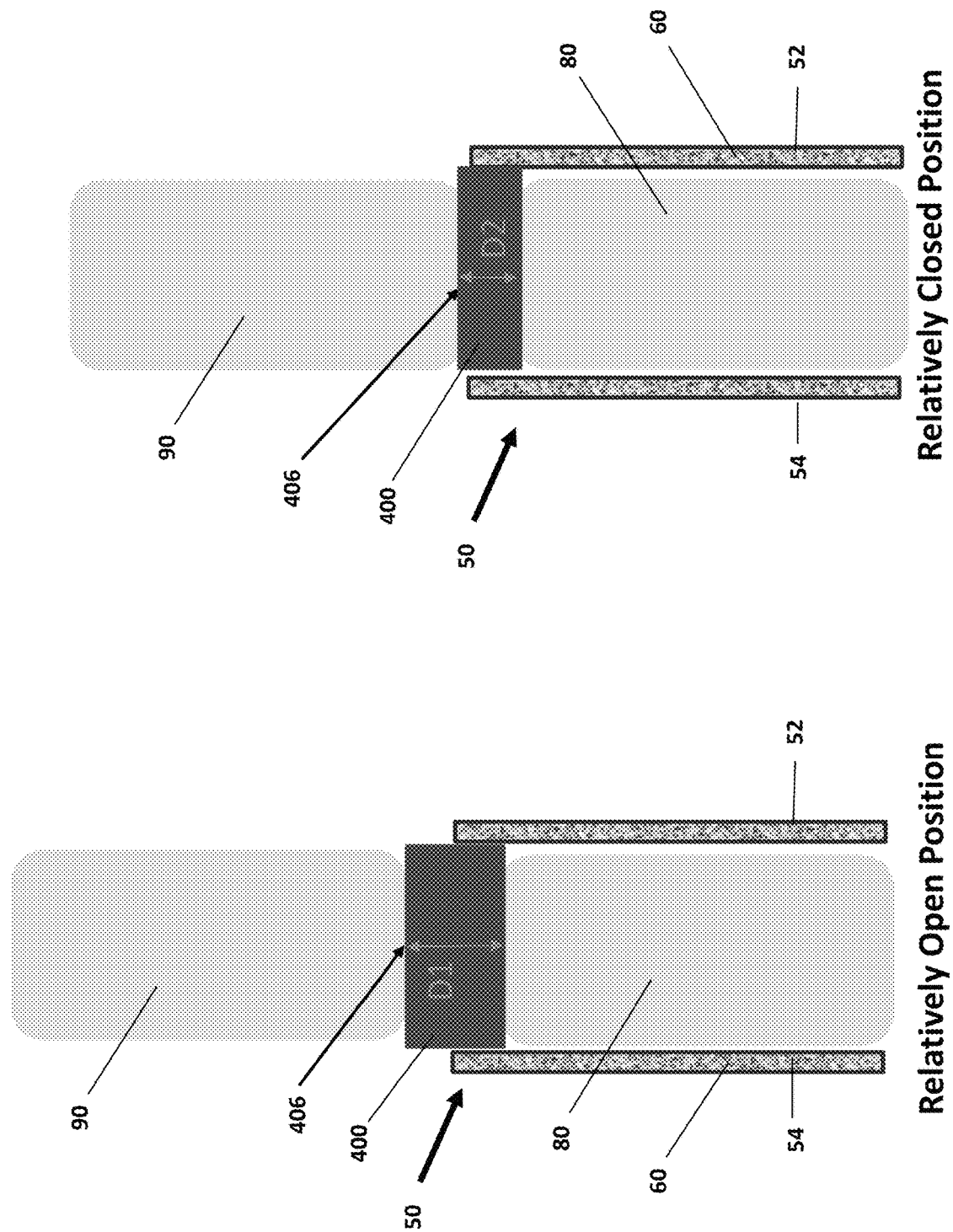

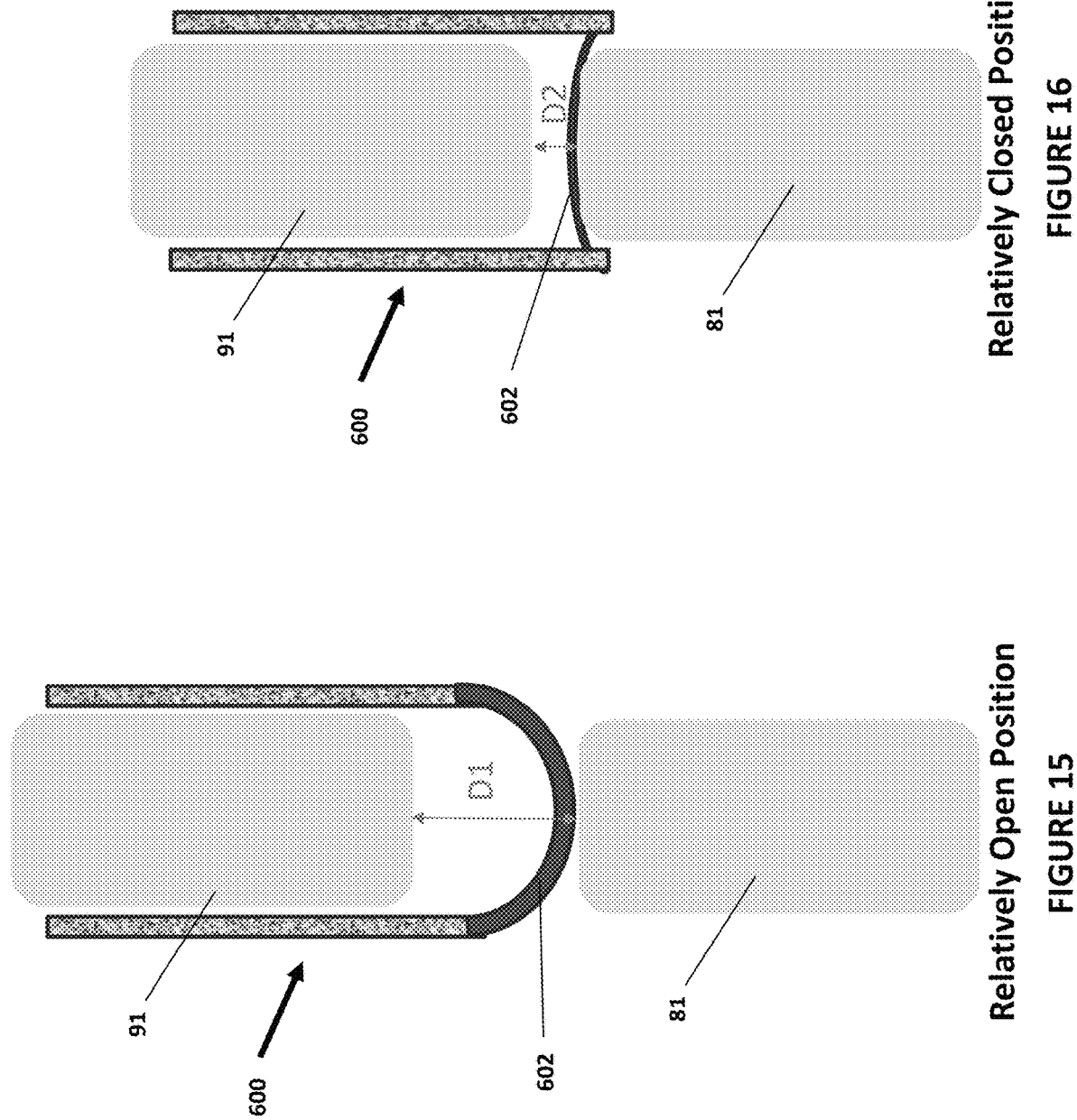

DENTAL APPLIANCE

1. BACKGROUND

A. Field of Invention

This invention relates generally to methods and apparatuses related to dentistry including methods and apparatuses related to the treatment of bruxism. This invention may treat other ailments and provide other advantages as well.

B. Bruxism

FIG. 1 shows a typical human mouth 10. The mouth 10 may include an upper jaw 12 having teeth 14 and a lower jaw 16 having teeth 14. More specifically, the teeth 14 for each jaw 12, 16 may include four incisors 18, two canines (also called cuspids) 20, four premolars 22 and six molars 24. The teeth 14 may extend from dental alveolus 30 as is known to those of skill in the art. FIG. 2 illustrates anterior head and neck muscles, including muscles of mastication. There are other head and neck muscles as well. It is a combination of head and neck muscles, and possibly other human muscles such as back muscles, that enable a person to move his/her mouth between open and closed positions such as to talk and to smile as well as to bite and chew food. This inventor considers that these muscles are related to and/or cause bruxism-involuntarily bruxism and voluntarily bruxism.

1) The Science of Bruxism

Bruxism is a disorder commonly known as clenching, bracing, gnashing, and/or grinding of one's teeth. Bruxism is considered a sleep disorder primarily because of the unconscious muscle activity that occurs when sleeping but also because of the potential for sleep disturbance. This muscle activity moves the lower jaw and, when teeth are present, allows involuntary grinding and clenching and forward thrusting of the lower teeth (or other protrusion) against the upper teeth (or other protrusion). Because this activity occurs during the unconscious state of sleep, the intensity of the dental clashing is quite destructive. The forces of bruxism caused by the muscles during sleep are reported to be ten times what can be elicited while awake because of our natural neurological governance to eliminate harming ourselves when conscious. This muscle activity during sleep is completely independent of an individual's control and occurs with an intensity that is able to fracture virgin teeth and irreversibly damage an individual's TMJ (jaw joint/Temporal Mandibular Joint). These periods of intense muscle activity occur during the course of sleep and usually only last for a total of 7-10 minutes, occurring in spurts of 1-3 minutes each. Sleep bruxism occurs as an unconscious response to impulses from deep from within the central nervous system. These impulses are thought to be related to stress. This inventor considers that the muscle activity that causes bruxism is related to muscle memory and Rhythmic Masticatory Muscle Activity (RMMA).

Unfortunately, the prevalence of bruxism is woefully underestimated because the majority of studies choose and qualify the participants via a questionnaire that asks each individual "if they clench or grind their teeth" or the like. This is a horribly unscientific and absolutely worthless way of selecting study participants because of the insidious nature of how most humans have little if any recollection of "grinding or clenching" during their sleep. Conversely, any trained dental professional can easily identify and demonstrate the signs and symptoms for an individual who is living with bruxism. A wake bruxism is similar to sleep bruxism except the muscle activity is of voluntary control.

2) The Treatment of Bruxism

This inventor considers that an understanding of the long-held axiom of canine disclusion (Also Known As [AKA] canine-protected occlusion) in humans is critical when attempting to attenuate bruxism. Generally, human teeth receive nervous innervation through the individual pulpal nerve (that enters each tooth through its apical foramen). These teeth also receive nervous innervation through their particular periodontal ligament that is a thin and highly innervated tissue that entirely and completely covers each tooth individually. Human maxillary (upper) canines receive pulpal nervous innervation from the trigeminal nerve (specifically the maxillary branch V2). Human mandibular (lower) canines receive pulpal nervous innervation from the mandibular branch of the trigeminal V3). The periodontal ligament of the upper human canine teeth also receives their innervation from the trigeminal nerve (specifically the maxillary branch V2). The periodontal ligament contains numerous sensory nerve fibers that provide proprioceptive feedback that helps in detecting the forces applied to the teeth-until further research refines or confirms nervous innervation. This inventor considers that these proprioceptive neurons play a crucial role in the fine control of jaw movements and in protecting the teeth from excessive forces. Much is known about the general pathways and function of these nerves, yet there are still areas that remain less understood. For instance, there can be individual variations in the exact pathways and branching patterns of these nerves including the different types of nerve fibers and receptors. Also, neuroplasticity of how the nervous system adapts to changes such as tooth loss, position, and attrition is an area of ongoing research. Interestingly, the Narwal whale (a mammal, as is humans) offers a peak into the unknown realm of neuroanatomy yet to be discovered and especially the importance of the human canine teeth. The dental appliance of this invention emphasizes the maxillary canine as the cornerstone of its efficacies. Not so ironically is the fact that the human maxillary canines are known to many in the dental field as the cornerstone of the human dentition. The anatomy of these canine roots exemplifies this honor, as these canines have the most root to crown ratio of all human teeth and consequently the most extensive periodontal ligament of all human teeth also. It is notable that these maxillary canines have root anatomy resembling both anterior and posterior root forms and are truly transitional in form and function, and as mentioned above, quite possibly some undiscovered nervous innervations common to both anterior and posterior teeth.

In light of the above discussion, a successful dental appliance should effectively utilize the canine disclusion principal. The dental appliance of this invention capitalizes on this principal in new and innovative ways. This dental appliance notably alters the forces involved when the upper canines are strategically engaged by a resilient and opposing, discluding element of potentially any customized resilience and direction. It is difficult if not impossible to apply any force vector physics and expect any meaningful results. As science continues to investigate and search for more about the phenomena of bruxism, this dental appliance will continue to help relax the relevant muscles and preserve human teeth by attenuating bruxism. This may be accomplished by attenuating the relevant muscle memory and/or by interrupting Rhythmic Masticatory Muscle Activity (RMMA)

C. Description of the Related Art

There are many known appliances/devices that are intended to treat bruxism. The most commonly known devices are occlusal guards that provide an interface of hard plastic that the teeth, controlled by the mastication muscles, can "skate" around on (at nighttime this control is involuntary and uninhibited especially during dreaming). Such a hard contact supposedly provides some freedom for the excessive muscular activity. The problem is that this muscle activity may actually be increased and these appliances may be triggering and enhancing muscle activity, making bruxism worse, not better.

Other known appliances/devices attempt to interface the teeth to teeth contact during the parafunctional muscular activity using a soft interface between all the opposing posterior teeth. Such soft interfaces, however, result in a mere cushioning of the parafunctional activity. This is the case in the well-known over the counter-home remedy "boil and bite" type of mouth guard. These appliances are bulky and do not fit comfortably. The excessive opening of the vertical dimension via posterior teeth loading and interference with the free-way space is damaging to the temporal mandibular joint (TM) or jaw joint). These devices encourage excessive muscular activity much like having chewing gum in one's mouth. Covering posterior teeth, whether with soft or hard material, will incite muscular activity and place undue stress on the jaw joint. A soft interface can also result simply in the creation of openings that conform to the shape of the teeth that bite down on them and thus provide no treatment of bruxism.

Still other known appliances/devices attempt to treat bruxism indirectly, rather than directly. By "directly" it is meant that the engagement of the patient's tooth/teeth with the dental appliance alone treats/attenuates bruxism. By "indirectly" it is meant that the engagement of the patient's tooth/teeth with the dental appliance is insufficient by itself to treat/attenuate bruxism. Instead, the dental appliance must be used with other components that engage other portions of the patient's body and/or require the use of other human senses beyond those used with the patient's mouth and bruxism related muscles. One example of an indirect approach to treating bruxism is U.S. Pat. No. 4,976,618 to Anderson which uses the patient's biting down on the appliance to create a sound that is then sent to the patient's ear with the hoped response being that the patient's hearing of the sound will ultimately discourage bruxism. Another example of an indirect approach to treating bruxism is U.S. Pat. No. 6,164,278 to Nissani which uses the patient's biting down on the appliance to release a liquid into the patient's mouth with the hoped response being that the patient's taste buds will be engaged to ultimately discourage bruxism. It is not known if such indirect methods work to influence bruxism. But even if they do, they are distracting (usually intended to wake the sleeping patient), uncomfortable, and likely to create embarrassment for the patient if used in the presence of others. As a result, appliances that use an indirect approach are very unlikely to be used consistently and thus very unlikely to achieve the intended result of treating/attenuating bruxism.

This inventor has already created dental appliances believed to be better at attenuating bruxism than the above-described dental devices in U.S. Pat. No. 8,826,913 (titled DENTAL APPLIANCE, "the '913 Patent") and U.S. Pat. No. 10,610,403 (titled DENTAL APPLIANCE, "the '403 Patent"), both of which are incorporated herein by reference in their entirety. The '403 Patent provides additional information regarding related art.

II. SUMMARY OF THE INVENTION

This inventor has discovered significant improvements in the treatment/attenuation of bruxism since the filings of the '913 Patent and the '403 Patent. These improvements will be described below. This invention has numerous treatment applications and benefits including, but not limited to: sleep bruxism; awake bruxism; bruxism diagnostic aid; lip biting; cheek biting; finger nail biting; tongue biting; keeping teeth apart when lips are together; disruptive to most oral parafuntion anxiety and stress; attenuating muscle memory; interrupting Rhythmic Masticatory Muscle Activity (RMMA); deprogrammer; therapeutic for habit cessation and habit modification; may alleviate TMJ (Temporal Mandibular Joint) clicking/popping; snoring; airway management; sleep apnea; endodontic pre-diagnostic; orthodontic computed radiography (CR) before treatment; light exercise disclusion; epileptic dental protection; presurgical readiness for functional mitral regurgitation (FMR); FDA approved material; screening for fibromyalgia; tension headaches leading to migraines; eliminating head and neck wrinkles; blood flow exercises; tinnitus; hypnotic relaxation; salivary flow exercises; myo muscular movements; facial muscle stretches; breath freshener; diet control taste; Parkinson teeth protection; biocompatible; physical therapy/exercises; obturator; sinusitis diagnosis aid; can be used: regardless of edentulous areas, over dentures, over partials, to protect implant restorations, to protect implant screws, with all restorative cases protecting restorations, with all occlusal schemes, with orthodontic retainers, and with bonded retainers.

According to some embodiments of this invention, a dental appliance may be used with an associated person having: A) a mouth including: 1) an upper jaw having a first canine tooth with an outer surface; and 2) a lower jaw having a first protrusion with an outer surface; and B) muscles operable to move the mouth between a relatively open position and a relatively closed position. The dental appliance may include: a first retaining surface; and a first treatment portion: A) supported to the first retaining surface; and B) having an outer surface. The dental appliance may be selectively positionable within the mouth into a treatment position where: 1) the first retaining surface retains the first treatment portion to the lower jaw; and 2) the first treatment portion is positioned between the outer surface of the first canine tooth and the outer surface of the first protrusion. When the dental appliance is in the treatment position and the mouth is in the relatively open position: 1) the outer surface of the first canine tooth may contact the outer surface of the first treatment portion at a first contact location; 2) there may be a distance D1 between the first contact location and the outer surface of the first protrusion; and 3) D1 may be at least 3 mm. When the dental appliance is in the treatment position and the mouth is in the relatively closed position: 1) the outer surface of the first canine tooth may contact the outer surface of the first treatment portion at the first contact location; 2) there may be a distance D2 between the first contact location and the outer surface of the first protrusion; and 3) D1-D2 may be at least 2 mm. Movement of the mouth from the relatively open position into the relatively closed position may cause the first treatment portion to apply a first force on the first canine tooth that: 1) continuously urges the mouth toward the relatively open position until the mouth returns to the relatively open position; and 2) directly attenuates bruxism.

According to some embodiments of this invention, the dental appliance directly attenuates bruxism by attenuating the muscle memory of the muscles used to move the mouth between a relatively open position and a relatively closed position.

According to some embodiments of this invention, the dental appliance directly attenuates bruxism by interrupting Rhythmic Masticatory Muscle Activity (RMMA).

According to some embodiments of this invention, when the dental appliance is in the treatment position and the mouth is in the relatively open position, the first treatment portion may dome shaped and when the dental appliance is in the treatment position and the mouth is in the relatively closed position, the first treatment portion may be concave shaped.

According to some embodiments of this invention, the first force may be caused at least in part by deformation of the first treatment portion when the mouth is moved from the relatively open position into the relatively closed position.

According to some embodiments of this invention, a sealed volume of fluid is positioned between the first treatment portion and the outer surface of the first protrusion and the first force is caused at least in part by compression of the sealed volume of fluid.

According to some embodiments of this invention, a compression spring may be positioned between the first treatment portion and the outer surface of the first protrusion and the first force may be caused at least in part by compression of the compression spring.

According to some embodiments of this invention, the first treatment portion may have a maximum thickness T that lies on a straight line interconnecting a midpoint of the first treatment portion and a midpoint of the lower protrusion. When the mouth is in the relatively open position, T may be 1 mm or less.

According to some embodiments of this invention, the first treatment portion may have an inner surface opposite its outer surface and the inner surface of the first treatment portion may contact the outer surface of the second jaw first protrusion when the mouth is in the relatively closed position.

According to some embodiments of this invention, the outer surface of the first treatment portion may be a maximum canine tooth contact area A and A may be 200 square mm or less.

According to some embodiments of this invention, D1 may be at least 5 mm; and D1-D2 may be at least 3 mm.

According to some embodiments of this invention, D1 may be at least 7 mm; and D1-D2 may be at least 4 mm.

According to some embodiments of this invention, the first protrusion on the lower jaw may be a canine tooth.

According to some embodiments of this invention, the first canine tooth may be on a first side of the mouth; the upper jaw may haves a second canine tooth on a second side of the mouth; the first protrusion may be on the first side of the mouth; and the lower jaw may have a second protrusion on the second side of the mouth. The dental appliance may include: A) a second retaining surface; and B) a second treatment portion: 1) supported to the second retaining surface; and 2) having an outer surface. When the dental appliance is in the treatment position: 1) the second retaining surface may retain the second treatment portion to the lower jaw; and 2) the second treatment portion may be positioned between the outer surface of the second canine tooth and the outer surface of the second protrusion. When the dental appliance is in the treatment position and the mouth is in the relatively open position: 1) the outer surface of the second canine tooth may contact the outer surface of the second treatment portion at a second contact location; 2) there may be a distance D3 between the second contact location and the outer surface of the second protrusion; and 3) D3 may be at least 3 mm. When the dental appliance is in the treatment position and the mouth is in the relatively closed position: 1) the outer surface of the second canine tooth may contact the outer surface of the second treatment portion at the second contact location; 2) there may be a distance D4 between the second contact location and the outer surface of the second protrusion; and 3) D3-D4 may be at least 2 mm. Movement of the mouth from the relatively open position into the relatively closed position may cause the second treatment portion to apply a second force on the second canine tooth that: 1) continuously urges the mouth toward the relatively open position until the mouth returns to the relatively open position; and 2) directly attenuates bruxism.

According to some embodiments of this invention, a dental appliance may be used with an associated person having: A) a mouth including: 1) a lower jaw having a first canine tooth with an outer surface; and 2) an upper jaw having a first protrusion with an outer surface; and B) muscles operable to move the mouth between a relatively open position and a relatively closed position. The dental appliance may include: a first retaining surface; and a first treatment portion: A) supported to the first retaining surface; and B) having an outer surface. The dental appliance may be selectively positionable within the mouth into a treatment position where: 1) the first retaining surface retains the first treatment portion to the upper jaw; and 2) the first treatment portion is positioned between the outer surface of the first canine tooth and the outer surface of the first protrusion. When the dental appliance is in the treatment position and the mouth is in the relatively open position: 1) the outer surface of the first canine tooth may contact the outer surface of the first treatment portion at a first contact location; 2) there may be a distance D1 between the first contact location and the outer surface of the first protrusion; and 3) D1 may be at least 3 mm. When the dental appliance is in the treatment position and the mouth is in the relatively closed position: 1) the outer surface of the first canine tooth may contact the outer surface of the first treatment portion at the first contact location; 2) there may be a distance D2 between the first contact location and the outer surface of the first protrusion; and 3) D1-D2 may be at least 2 mm. Movement of the mouth from the relatively open position into the relatively closed position may cause the first treatment portion to apply a first force on the first canine tooth that: 1) continuously urges the mouth toward the relatively open position until the mouth returns to the relatively open position; and 2) directly attenuates bruxism.

According to some embodiments of this invention, the first canine tooth may be on a first side of the mouth; the lower jaw may have a second canine tooth on a second side of the mouth; the first protrusion may be on the first side of the mouth; and the upper jaw may have a second protrusion on the second side of the mouth. The dental appliance may include: A) a second retaining surface; and B) a second treatment portion: 1) supported to the second retaining surface; and 2) having an outer surface. When the dental appliance is in the treatment position: 1) the second retaining surface may retain the second treatment portion to the upper jaw; and 2) the second treatment portion may be positioned between the outer surface of the second canine tooth and the outer surface of the second protrusion. When the dental appliance is in the treatment position and the mouth is in the relatively open position: 1) the outer surface of the second canine tooth may contact the outer surface of the second treatment portion at a second contact location; 2) there may be a distance D3 between the second contact location and the outer surface of the second protrusion; and 3) D3 may be at least 3 mm. When the dental appliance is in the treatment position and the mouth is in the relatively closed position: 1) the outer surface of the second canine tooth may contact the outer surface of the second treatment portion at the second contact location; 2) there may be a distance D4 between the second contact location and the outer surface of the second protrusion; and 3) D3-D4 may be at least 2 mm. Movement of the mouth from the relatively open position into the relatively closed position may cause the second treatment portion to apply a second force on the second canine tooth that: 1) continuously urges the mouth toward the relatively open position until the mouth returns to the relatively open position; and 2) directly attenuates bruxism.

Additional benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIG. 9 is a sectional view similar to the sectional of FIG. 5 but showing a treatment portion according to other embodiments of this invention with the mouth in a relatively open position.

FIG. 10 is a sectional view similar to the sectional view of FIG. 9 but showing the mouth in a relatively closed position.

FIG. 11 is a sectional view similar to the sectional of FIG. 5 but showing a treatment portion according to other embodiments of this invention with the mouth in a relatively open position.

FIG. 12 is a sectional view similar to the sectional view of FIG. 11 but showing the mouth in a relatively closed position.

FIG. 13 is a sectional view similar to the sectional of FIG. 5 but showing a treatment portion according to other embodiments of this invention with the mouth in a relatively open position.

FIG. 14 is a sectional view similar to the sectional view of FIG. 13 but showing the mouth in a relatively closed position.

FIG. 15 is a sectional view similar to the sectional of FIG. 5 but showing the dental appliance and treatment portion supported to an upper jaw with the mouth in a relatively open position.

FIG. 16 is a sectional view similar to the sectional view of FIG. 15 but showing the mouth in a relatively closed position.

IV. DETAILED DESCRIPTION OF THE INVENTION

The treatment portion(s) of this invention are designed such that when the person/patient moves his/her mouth from a relatively open position to a relatively closed position, such as occurs when the person/patient is involuntarily biting down during a bruxism incident, the treatment portion(s) applies a force(s) onto his/her canine tooth/teeth that continuously urges his/her mouth into the relatively open position until his/her mouth returns to the relatively open position. This inventor has discovered that this force(s) directly attenuates bruxism and other maladies. As explained above, by "directly" it is meant that the engagement of the person's/patient's tooth/teeth with the dental appliance alone attenuates bruxism.

Figure 3:
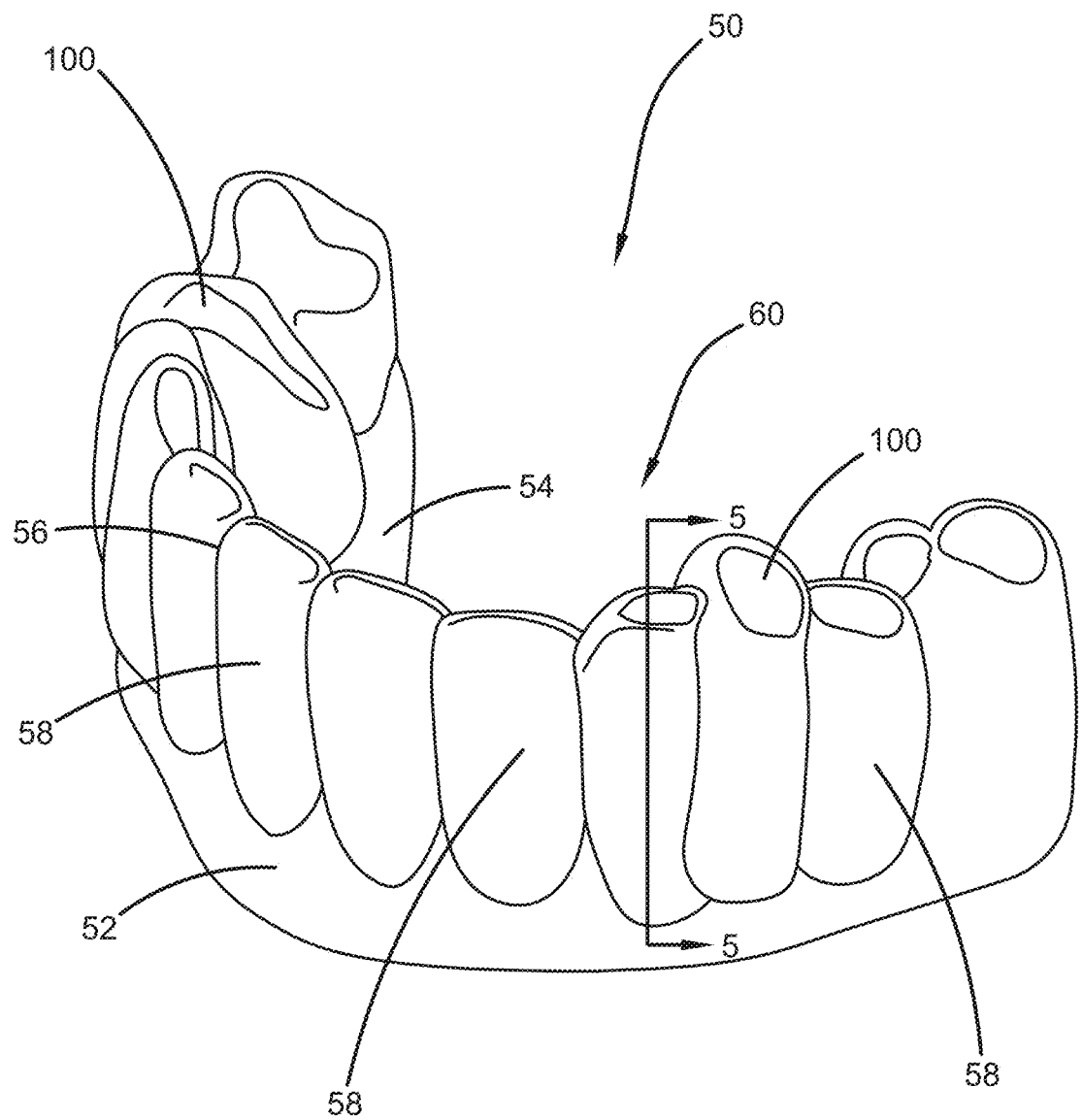
FIG. 3 is a perspective view of a dental appliance according to some embodiments of this invention.
Figure 4:
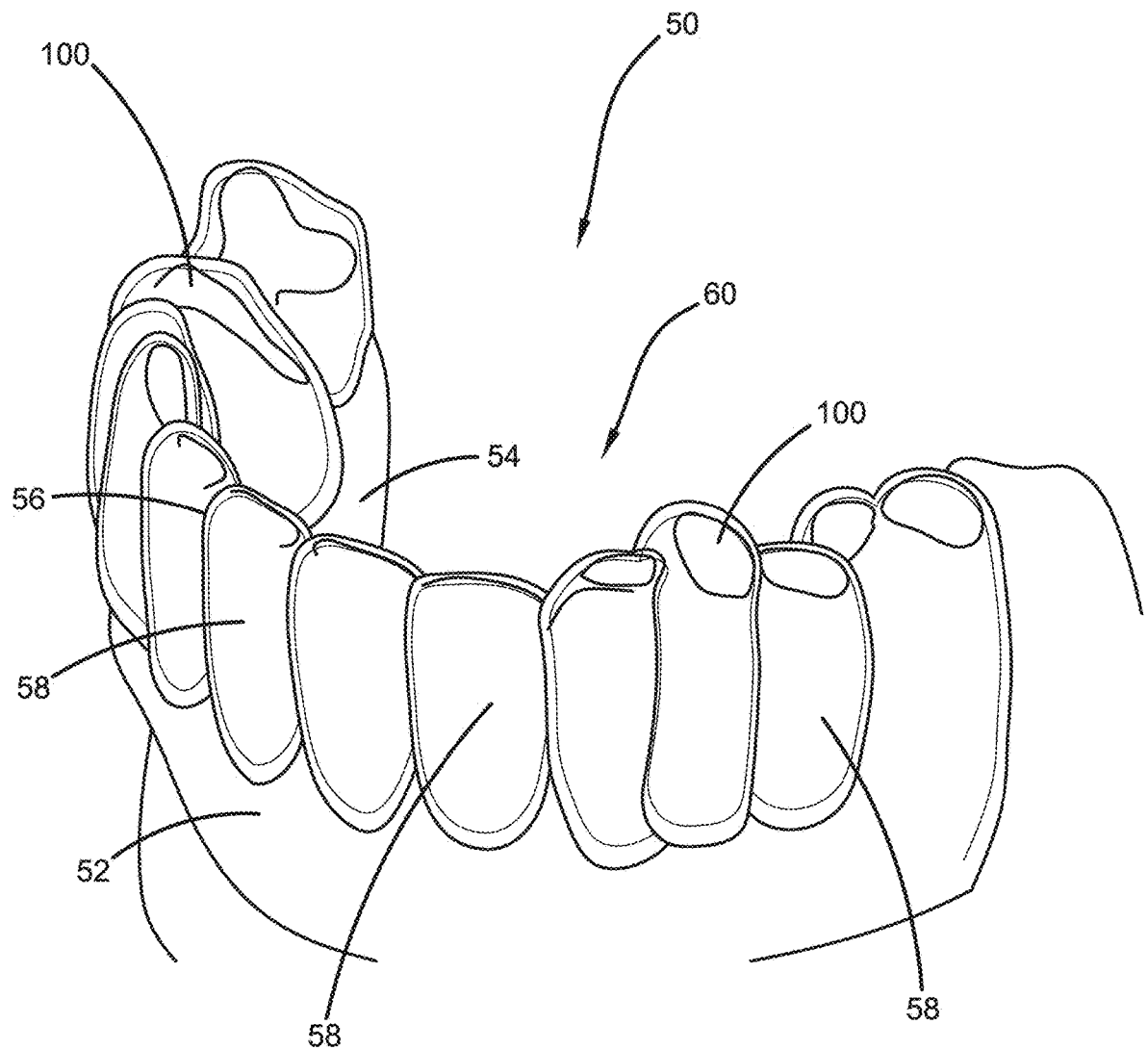
FIG. 4 shows the dental appliance of FIG. 3 retained to a human lower jaw.

Referring now to the drawings wherein the showings are for purposes of illustrating embodiments of the invention only and not for purposes of limiting the same, and wherein like reference numerals are understood to refer to like components, FIGS. 3 and 4 show a dental appliance 50 according to some embodiments of this invention. The dental appliance 50 may include one or two treatment portions 100, that directly attenuate bruxism and one or more retaining surfaces 60 that retain the appliance to the person/patient's mouth. FIG. 4 illustrates the dental appliance 50 retained to a person/patient's lower jaw. In one embodiment, the dental appliance 50 may include a body comprising a front wall 52, a back wall 54, and a top 56 connecting the front wall 52 to the back wall 54. The body may define teeth reception zones 58. One or more of the walls 52, 54 and and/or the teeth reception zones 58 and/or at least a portion of the top 56 may define the retaining surface 60 in some embodiments. The treatment portions 100 are supported to the retaining surface 60, as shown. This support can be of any type chosen with the sound judgment of a person of skill in the art. In some embodiments, the treatment portion 100 is made as one piece with the rest of the dental appliance 50. In some embodiments, the treatment portion 100 is made separate from the dental appliance 50 and then supported to the dental appliance 50 in a separate step.

Figure 1:
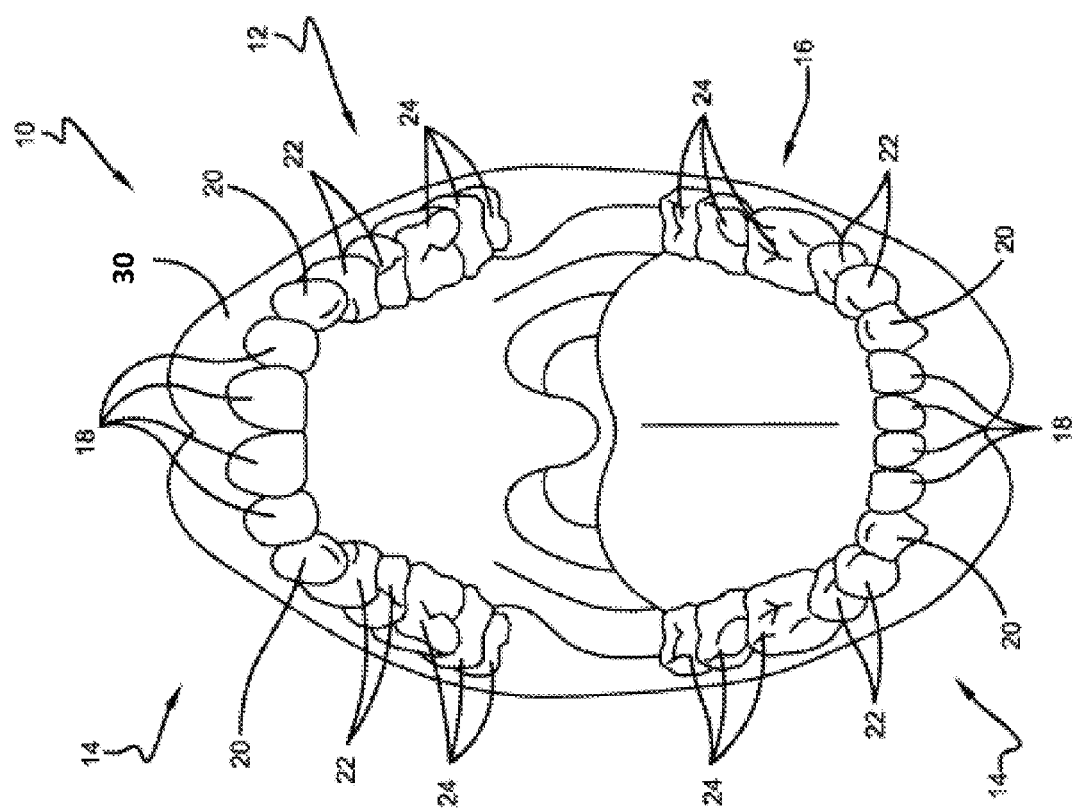
FIG. 1 is a front perspective view of a human mouth.
Figure 2:
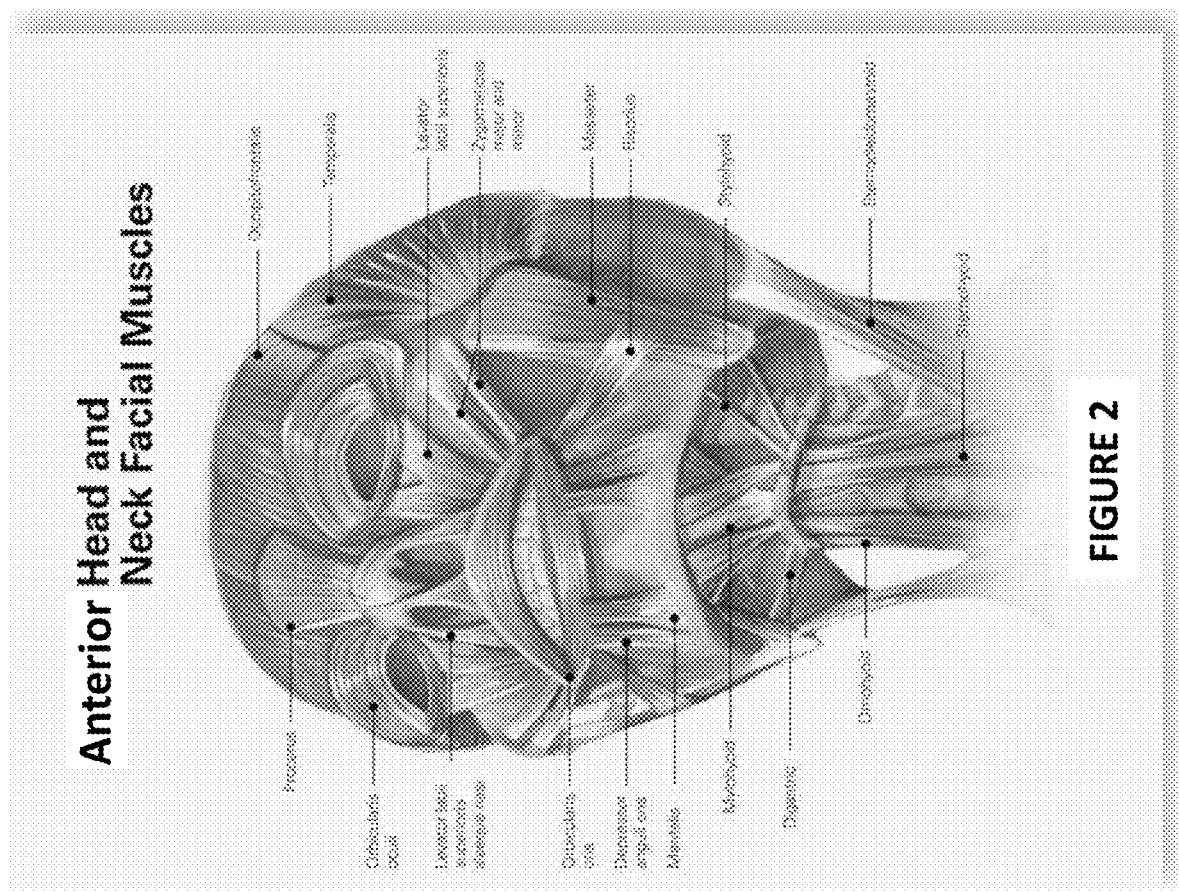
FIG. 2 illustrates human anterior head and neck facial muscles.

It should be understood that throughout this specification and claims that "protrusion" refers to any protrusion extending from one jaw toward the other jaw and includes, but is not limited to, one or more teeth, one or more dental implants, one or more dental bridges, one or more dentures, one or more other dental appliances, or the like. Thus, this invention is not limited to persons/patients having the layout and orientation of teeth provided in FIG. 1. The '403 Patent discloses other orientations of teeth that also work well with this invention. Because the operation of the retaining surface (s) in this invention is similar to those disclosed in the '403 Patent, details won't be repeated here. Note, however, that as is also disclosed in the '403 Patent, the dental appliances for this invention may have two or more separate parts or sections, each having its own retaining surface and treatment portion. In one non-limiting example, one part or section may be positioned on one side of the mouth while the other is positioned on the opposite side of the mouth.

Figure 5:
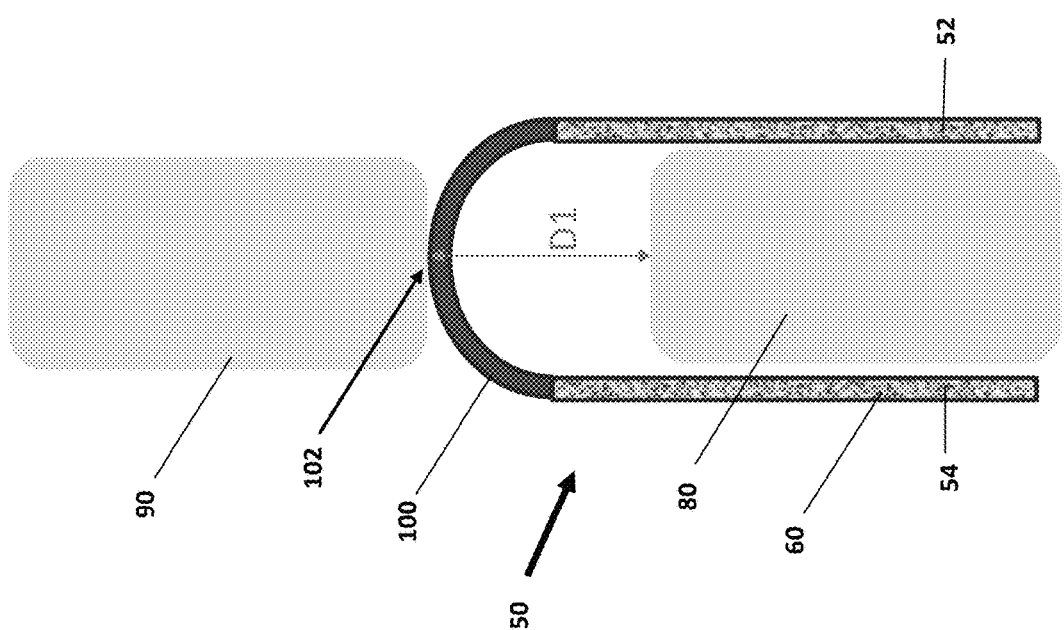
FIG. 5 is a sectional view taken through line 5-5 in FIG. 3 showing the mouth in a relatively open position.

With reference now to FIGS. 3-5, one embodiment of a treatment portion, treatment portion 100, will be described. FIG. 5 shows a sectional view taken through line 5-5 in FIG. 3. The retaining surface 60, using walls 52, 54, is shown retaining the dental appliance 50 and thus the treatment portion 100, to the lower jaw via lower jaw protrusion 80. As explained above, the lower jaw protrusion 80 could be one or more lower teeth, one or more dental implants, one or more dental bridges, one or more dentures, one or more other dental appliances, or the like supported to the lower jaw. FIG. 5 also shows a canine tooth 90 extending from the upper jaw. FIG. 5 shows the treatment portion 100 positioned between the outer surface of the lower jaw protrusion 80 and the outer surface of the upper canine tooth 90 and the outer surface of the upper canine tooth 90 is contacting the outer surface of the treatment portion 100 at a contact location 102 without applying any force (downward in this view) onto the treatment portion 100. Thus, FIG. 5 shows the mouth in a relatively open position. With the mouth in the relatively open position, there is a distance D1 between the contact location 102 and the outer surface of the lower jaw protrusion 80.

Figure 6:
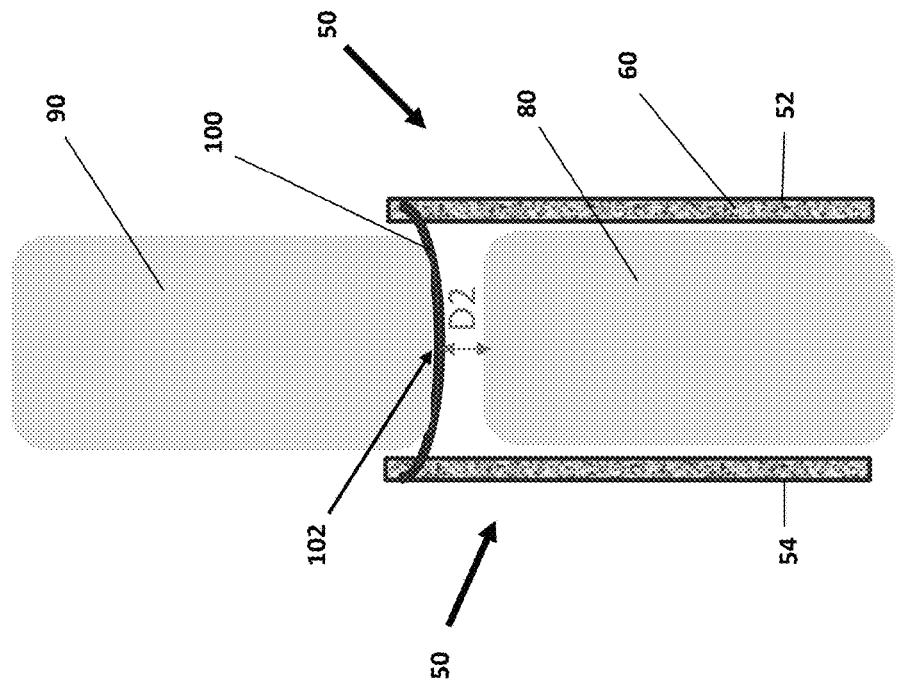
FIG. 6 is a sectional view similar to the sectional view of FIG. 5 but showing the mouth in a relatively closed position.

FIG. 6 is similar to FIG. 5 except that the mouth has been moved into a relatively closed position such as occurs when a person/patient is biting down during a bruxism incident. As a result, there is a distance D2 between the contact location 102 and the outer surface of the lower jaw protrusion 80 that is less than distance D1. This movement of the mouth from the relatively open position (FIG. 5) into the relatively closed position (FIG. 6) causes the treatment portion 100 to apply a force on the upper jaw canine tooth 90 that continuously urges the mouth toward the relatively open position until the mouth returns to the relatively open position (FIG. 5). This force also directly trains the relevant muscles to stop involuntarily moving the mouth from the relatively open position (FIG. 5) to the relatively closed position (FIG. 6) thereby directly attenuating bruxism. Note that the shape and size of the contact location 110 may vary depending on the shape and size of the protrusion 80, the shape and size of the canine tooth 90, the shape and size of the treatment portion 100 and the amount of force exerted by the person/patient biting down when moving the mouth from the relatively open position to the relatively closed position.

Figure 8:
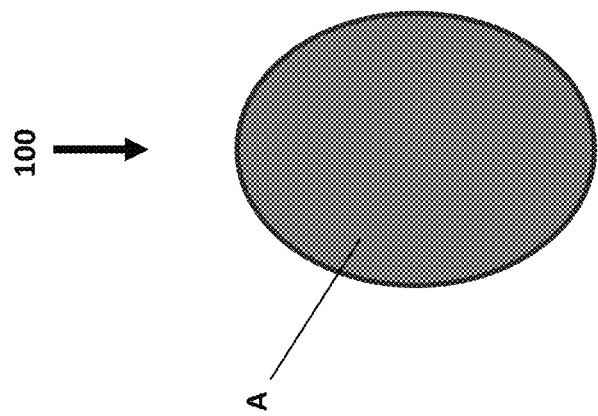
FIG. 8 illustrates a top view of a treatment portion according to some embodiments of this invention.
Figure 7:
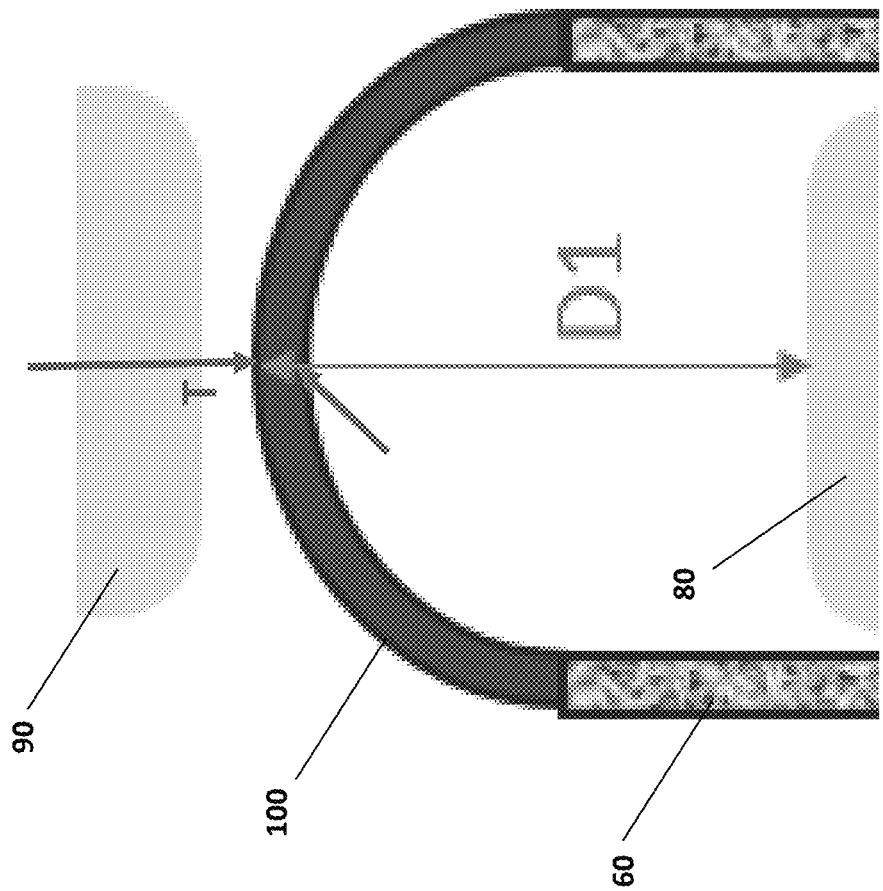
FIG. 7 is a close-up view of a portion of FIG. 5.

With reference now to FIGS. 3 and 5-8, in some embodiments treatment portion 100 may operate like a compression spring. As the person/patient bites down (from FIG. 5 to FIG. 6) the treatment portion 100 may be deformed (as shown in FIG. 6) and this deformation may at least in part "load" the treatment portion 100 so that it responds by applying the force (upward in FIG. 6) to directly attenuate bruxism. In some embodiments the force is caused at least in part by compression of atmospheric air between the treatment portion 100 and the outer surface of the lower jaw protrusion 80. In some embodiments, shown, treatment portion 100 may be dome shaped. This shape may assist in providing the force to directly attenuate bruxism. In some embodiments, shown in FIG. 7, treatment portion 100 may have a maximum thickness T that lies on a straight line interconnecting the midpoint of the treatment portion 100 and the midpoint of the lower jaw protrusion 80. In some embodiments, T is 1 mm or less. FIG. 8 illustrates a top view of the treatment portion 100 according to some embodiments of this invention. This view illustrates the portion of the outer surface of treatment portion 100 that may be contacted by the outer surface of the canine tooth 90; thus, it can be considered the maximum canine tooth contact area A. In some embodiments, A is 200 square mm or less.

FIGS. 9-10 illustrate another embodiment using treatment portion 200 with a dental appliance. Treatment portion 200 could be used as an alternative to treatment portion 100 described above. Thus, treatment portion 200 may be supported to the retaining surface 60 of a dental appliance 50 in the same way(s). FIGS. 9-10 are similar to FIGS. 5-6 as they show the same views through the dental appliance. Treatment portion 200 works with a sealed volume of fluid 202 that is positioned between the treatment portion 200 and the outer surface of the lower jaw protrusion 80. Fluid 202 may be sealed in an elastic container 204. Fluid 202 may be of any type chosen with the sound judgement of a person of skill in the art. In some embodiments, fluid 202 is at atmospheric pressure while in other embodiments fluid 202 is at a pressure above atmospheric pressure. Container 204 may be of any shape and size chosen with the sound judgment of a person of skill in the art. When the person/patient moves the mouth from the relatively open position (FIG. 9) into the relatively closed position (FIG. 10), such as occurs when a person/patient is involuntarily biting down during a bruxism incident, the shape of the container 204 changes as shown (compare FIG. 9 to FIG. 10) and the distance between the contact location 206 and the outer surface of the lower jaw protrusion 80 is reduced from distance D1 (FIG. 9) to distance D2 (FIG. 10). This change in distance caused by the change in the shape of the container 204 and/or change in the pressure of the fluid 202 causes the treatment portion 200 to apply a force on the upper canine tooth 90 that continuously urges the mouth toward the relatively open position until the mouth returns to the relatively open position. This force also directly trains the relevant muscles to stop involuntarily moving the mouth from the relatively open position (FIG. 9) to the relatively closed position (FIG. 10) thereby directly attenuating bruxism.

FIGS. 11-12 illustrate another embodiment using treatment portion 300 with a dental appliance. Treatment portion 300 could be used as an alternative to treatment portion 100 described above. Thus, treatment portion 300 may be supported to the retaining surface 60 of a dental appliance 50 in the same way(s). FIGS. 11-12 are similar to FIGS. 5-6 as they show the same views through the dental appliance. Treatment portion 300 works with a compression spring 302 that is positioned between the treatment portion 300 and the outer surface of the lower jaw protrusion 80. Compression spring 302 may be sealed in a container if desired (not shown). Compression spring 302 may be of any type chosen with the sound judgement of a person of skill in the art. When the person/patient moves the mouth from the relatively open position (FIG. 11) into the relatively closed position (FIG. 12), such as occurs when a person/patient is involuntarily biting down during a bruxism incident, the spring 302 compresses as shown (compare FIG. 11 to FIG. 12) and the distance between the contact location 306 and the outer surface of the lower jaw protrusion 80 is reduced from distance D1 (FIG. 11) to distance D2 (FIG. 12). This change in distance caused by the compression of compression spring 302 causes the treatment portion 300 to apply a force on the upper canine tooth 90 that continuously urges the mouth toward the relatively open position until the mouth returns to the relatively open position. This force also directly trains the relevant muscles to stop involuntarily moving the mouth from the relatively open position (FIG. 11) to the relatively closed position (FIG. 12) thereby directly attenuating bruxism.

FIGS. 13-14 illustrate another embodiment using treatment portion 400 with a dental appliance. Treatment portion 400 could be used as an alternative to treatment portion 100 described above. Thus, treatment portion 400 may be supported to the retaining surface 60 of a dental appliance 50 in the same way(s). FIGS. 13-14 are similar to FIGS. 5-6 as they show the same views through the dental appliance. Treatment portion 400 is positioned between the outer surface of the upper canine tooth 90 and the outer surface of the lower jaw protrusion 80. Treatment portion 400 may be made in whole or part of a material(s) that behaves like a compression spring. The specific material can be any chosen with the sound judgement of a person of skill in the art. In one embodiment, treatment portion 400 may be formed in whole or part of an elastomeric material. When the person/patient moves the mouth from the relatively open position (FIG. 13) into the relatively closed position (FIG. 14), such as occurs when a person/patient is involuntarily biting down during a bruxism incident, treatment portion 400 compresses as shown (compare FIG. 13 to FIG. 14) and the distance between the contact location 406 and the outer surface of the lower jaw protrusion 80 is reduced from distance D1 (FIG. 13) to distance D2 (FIG. 14). This change in distance caused by the compression of treatment portion 400 causes treatment portion 400 to apply a force on the upper canine tooth 90 that continuously urges the mouth toward the relatively open position until the mouth returns to the relatively open position. This force also directly trains the relevant muscles to stop involuntarily moving the mouth from the relatively open position (FIG. 13) to the relatively closed position (FIG. 14) thereby directly attenuating bruxism.

With reference now to FIGS. 5-6 and 9-14 this inventor has discovered that the distances D1 and D2 are important factors in achieving the desired results of training the relevant muscles to directly attenuate bruxism. As a general rule, increasing distance D1 and simultaneously increasing the difference between distance D1 and D2 (D1-D2) increases the force provided to directly attenuate bruxism. In some embodiments, D1 is at least 3 mm; and D1-D2 is at least 2 mm. In some embodiments D1 is at least 5 mm and D1-D2 is at least 3 mm. In some embodiments D1 is at least 7 mm and D1-D2 is at least 4 mm.

It should be noted that there are many variations that are effective with the operation of this invention to directly attenuate bruxism. As one example, the embodiments shown in FIGS. 3-4 show a treatment portion 100 on each side of the mouth designed to engage with a corresponding canine tooth. This is the ideal application as the result would be that a force to directly train the relevant muscles to stop involuntarily moving the mouth from the relatively open position to the relatively closed position to thereby directly attenuate bruxism would occur on each side of the mouth. This use of two forces simultaneously urging the mouth toward the relatively open position is believed to be the most effective. However, there may be persons/patients who have dental conditions that prevent the ideal application-perhaps, for example, a person/patient may have teeth on only one side of his/her mouth. In situations like this, it is important to note that only one treatment portion is still effective in urging the mouth toward the relatively open position to thereby directly attenuate bruxism. As another example, in the ideal application the treatment portion is positioned between an upper canine tooth and a lower canine tooth. However, there may be persons/patients who have dental conditions that prevent the ideal application-perhaps, for example, a person/patient may have a canine tooth on one side of a jaw but no corresponding canine tooth on the same side of the other jaw. In situations like this, it is important to note that the treatment portion is still effective in urging the mouth toward the relatively open position to thereby directly attenuate bruxism when it is positioned between the canine tooth on one jaw and any other protrusion on the opposite jaw. As another example, the embodiments above show the dental appliance supported to a lower jaw and interacting with one or two upper canine teeth. In another embodiment, shown in FIGS. 15-16, dental appliance 600 has a treatment portion 602 supported to the upper jaw, via upper jaw protrusion 91, and interacting with a lower canine tooth 81 to directly attenuate bruxism. In this case, treatment portion 602 engages with lower canine tooth 81 in the same way as treatment portions describe above engage with upper canine tooth 90 to urge the mouth toward the relatively open position to directly attenuate bruxism. While treatment portion 602 is similar in design to treatment portion 100 described above, it should be noted that any of the treatment portion embodiments described above can be used with dental appliance 600. As yet another example, the discussion above explains that the ideal dental appliance will utilize the canine disclusion principal-thus the treatment portions will ideally interact with a person's/patient's canine tooth/teeth. The embodiments described above apply this ideal application. However, there may be persons/patients who have dental conditions that prevent the ideal application-perhaps, for example, a person/patient may have no canine teeth. In situations like this, it is important to note that one or more treatment portions can be positioned between upper and lower protrusions that do not include a canine tooth and still be effective in urging the mouth toward the relatively open position to thereby directly attenuate bruxism. Also explained above is an embodiment where the maximum protrusion contact area is 200 mm or less. This is not a limitation to the operation of this invention. The maximum contact area can be any size, shape and location chosen with the sound judgement of a person of skill in the art. The treatment area may, for example, be positioned between any number of projections (teeth or otherwise) on the upper jaw and the lower jaw. In some of the embodiments disclosed above, the treatment portion has an inner surface opposite its outer surface and this inner surface is spaced from the outer surface of the corresponding projection even when the mouth is in the relatively closed position—see, for examples, FIGS. 6, 10 and 12. In other embodiments, however, the inner surface of the treatment portion contacts the outer surface of the corresponding protrusion when the mouth is in the relatively closed position as shown in FIG. 14. In the embodiments disclosed above, the dental appliance is not positioned between posterior teeth (or between other protrusions in the same area). In other embodiments, the dental appliance is positioned between posterior teeth (or between other protrusions in the same area).

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

I claim:

1. A dental appliance for use with an associated person having: A) a mouth including: 1) an upper jaw having a first canine tooth with an outer surface; and 2) a lower jaw having a first protrusion with an outer surface; and B) muscles operable to move the mouth between a relatively open position and a relatively closed position; the dental appliance comprising:
- a first retaining surface; and
- a first treatment portion:
  - A) supported to the first retaining surface; and
  - B) having an outer surface;
- wherein:
  - A) the dental appliance is selectively positionable within the mouth into a treatment position where, is use:
    1) the first retaining surface retains the first treatment portion to the lower jaw; and
    2) the first treatment portion is directly positioned between the outer surface of the first canine tooth and the outer surface of the first protrusion;
  - B) when the dental appliance is in the treatment position and the mouth is in the relatively open position:
    1) the outer surface of the first canine tooth contacts the outer surface of the first treatment portion at a first contact location;
    2) there is a distance D1 between the first contact location and the outer surface of the first protrusion; and
    3) D1 is at least 3 mm; and
  - C) when the dental appliance is in the treatment position and the mouth is in the relatively closed position:
    1) The outer surface of the first canine tooth contacts the outer surface of the first treatment portion at the first contact location;
    2) There is a distance D2 between the first contact location and the outer surface of the first protrusion; and
    3) D1-D2 is at least 2 mm; and
  - D) movement of the mouth from the relatively open position into the relatively closed position is configured to cause the first treatment portion to apply a first force on the first canine tooth that:
    1) continuously urges the mouth toward the relatively open position until the mouth returns to the relatively open position; and
    2) directly attenuates bruxism; and
- wherein:
- E) when the dental appliance is in the treatment position and the mouth is in the relatively open position, the first treatment portion is dome shaped; and
- when the dental appliance is in the treatment position and the mouth is in the relatively closed position, the first treatment portion is concave shaped.

2. The dental appliance of claim 1 wherein:
the first canine tooth is on a first side of the mouth;
the upper jaw has a second canine tooth on a second side of the mouth;
the first protrusion is on the first side of the mouth;
the lower jaw has a second protrusion on the second side of the mouth;
the dental appliance includes:
- A) a second retaining surface; and
- B) a second treatment portion:
  1) Supported to the second retaining surface; and
  2) Having an outer surface;

wherein:
- A) when the dental appliance is in the treatment position:
  1) the second retaining surface retains the second treatment portion to the lower jaw; and
  2) the second treatment portion is positioned between an outer surface of the second canine tooth and an outer surface of the second protrusion;
- B) when the dental appliance is in the treatment position and the mouth is in the relatively open position:
  1) the outer surface of the second canine tooth contacts the outer surface of the second treatment portion at a second contact location;
  2) there is a distance D3 between the second contact location and the outer surface of the second protrusion; and
  3) D3 is at least 3 mm; and
- C) when the dental appliance is in the treatment position and the mouth is in the relatively closed position:
  1) the outer surface of the second canine tooth contacts the outer surface of the second treatment portion at the second contact location;
  2) there is a distance D4 between the second contact location and the outer surface of the second protrusion; and
  3) D3-D4 is at least 2 mm; and
- D) movement of the mouth from the relatively open position into the relatively closed position is configured to cause the second treatment portion to apply a second force on the second canine tooth that:
  1) continuously urges the mouth toward the relatively open position until the mouth returns to the relatively open position; and
  2) directly attenuates bruxism.

3. The dental appliance of claim 2 wherein:
the first protrusion is a third canine tooth; and
the second protrusion is a fourth canine tooth.

4. The dental appliance of claim 1 wherein:
the associated person is configured to at least sometimes operate the muscles based on muscle memory; and
the dental appliance is configured to directly attenuate bruxism by attenuating the muscle memory.

5. The dental appliance of claim 1 wherein:
the dental appliance is configured to directly attenuate attenuates bruxism by interrupting Rhythmic Masticatory Muscle Activity (RMMA).

6. The dental appliance of claim 1 wherein:
the first force is configured to be caused at least in part by deformation of the first treatment portion when the mouth is moved from the relatively open position into the relatively closed position.

7. The dental appliance of claim 1 wherein:
the first treatment portion has a maximum thickness T that lies on a straight line configured to interconnect a midpoint of the first treatment portion and a midpoint of the first protrusion; and
when the mouth is in the relatively open position, thickness T is 1 mm or less.

8. The dental appliance of claim 1 wherein:
the outer surface of the first treatment portion has a maximum canine tooth contact area A; and
A is 200 square mm or less.

9. The dental appliance of claim 1 wherein:
D1 is at least 5 mm; and
D1-D2 is at least 3 mm.

10. The dental appliance of claim 1 wherein:
D1 is at least 7 mm; and
D1-D2 is at least 4 mm.

11. The dental appliance of claim 1 wherein:
the first protrusion on the lower jaw is a canine tooth.

12. A dental appliance for use with an associated person having: A) a mouth including: 1) a lower jaw having a first canine tooth with an outer surface; and 2) an upper jaw having a first protrusion with an outer surface; and B) muscles operable to move the mouth between a relatively open position and a relatively closed position; the dental appliance comprising:
  a first retaining surface; and
  a first treatment portion:
    A) supported to the first retaining surface; and
    B) having an outer surface;
  wherein:
    A) the dental appliance is selectively positionable within the mouth into a treatment position portion is directly positioned
      1) the first retaining surface retains the first treatment portion to the upper jaw; and
      2) the first treatment portion is positioned between the outer surface of the first canine tooth and the outer surface of the first protrusion;
    B) when the dental appliance is in the treatment position and the mouth is in the relatively open position:
      1) the outer surface of the first canine tooth contacts the outer surface of the first treatment portion at a first contact location;
      2) there is a distance D1 between the first contact location and the outer surface of the first protrusion; and
      3) D1 is at least 3 mm; and
    C) when the dental appliance is in the treatment position and the mouth is in the relatively closed position:
      1) the outer surface of the first canine tooth contacts the outer surface of the first treatment portion at the first contact location;
      2) there is a distance D2 between the first contact location and the outer surface of the first protrusion; and
      3) D1-D2 is at least 2 mm; and
    D) movement of the mouth from the relatively open position into the relatively closed position is configured to cause the first treatment portion to apply a first force on the first canine tooth that:
      1) continuously urges the mouth toward the relatively open position until the mouth returns to the relatively open position; and
      2) directly attenuates bruxism; and
  wherein:
    E) when the dental appliance is in the treatment position and the mouth is in the relatively open position, the first treatment portion is dome shaped; and
  when the dental appliance is in the treatment position and the mouth is in the relatively closed position, the first treatment portion is concave shaped.

13. The dental appliance of claim 12 wherein:
the first canine tooth is on a first side of the mouth;
the lower jaw has a second canine tooth on a second side of the mouth;
the first protrusion is on the first side of the mouth;
the upper jaw has a second protrusion on the second side of the mouth;
the dental appliance includes:
  A) a second retaining surface; and
  B) a second treatment portion:
    1) supported to the second retaining surface; and
    2) having an outer surface;
wherein:
  A) when the dental appliance is in the treatment position:
    1) the second retaining surface retains the second treatment portion to the upper jaw; and
    2) the second treatment portion is positioned between an outer surface of the second canine tooth and an outer surface of the second protrusion;
  B) when the dental appliance is in the treatment position and the mouth is in the relatively open position:
    1) the outer surface of the second canine tooth contacts the outer surface of the second treatment portion at a second contact location;
    2) There is a distance D3 between the second contact location and the outer surface of the second protrusion; and
    3) D3 is at least 3 mm; and
  C) when the dental appliance is in the treatment position and the mouth is in the relatively closed position:
    1) The outer surface of the second canine tooth contacts the outer surface of the second treatment portion at the second contact location;
    2) There is a distance D4 between the second contact location and the outer surface of the second protrusion; and
    3) D3-D4 is at least 2 mm; and
  D) movement of the mouth from the relatively open position into the relatively closed position is configured to cause the second treatment portion to apply a second force on the second canine tooth that:
    1) Continuously urges the mouth toward the relatively open position until the mouth returns to the relatively open position; and
    2) directly attenuates bruxism.

14. The dental appliance of claim 12 wherein:
the associated person is configured to at least sometimes operate the muscles based on muscle memory; and
the dental appliance is configured to directly attenuate bruxism by attenuating the muscle memory.

15. The dental appliance of claim 12 wherein:
the dental appliance is configured to directly attenuate bruxism by interrupting Rhythmic Masticatory Muscle Activity (RMMA).

16. The dental appliance of claim 12 wherein:
the first protrusion on the upper jaw is a canine tooth.

* * * * *